United States Patent [19]

Williams, Jr. et al.

[11] 4,422,723

[45] Dec. 27, 1983

[54] ADJUSTABLE REFLECTOR WITH IMPERFORATE REFLECTIVE MEMBRANE

[75] Inventors: Carl L. Williams, Jr.; Robert S. Black; Larry R. Payne, all of Abilene, Tex.

[73] Assignee: LaJet Energy Company, Abilene, Tex.

[21] Appl. No.: 291,911

[22] Filed: Aug. 11, 1981

[51] Int. Cl.³ .............................................. G02B 5/10
[52] U.S. Cl. .................................................. 350/295
[58] Field of Search ........................ 350/295; 84/411 R

[56] References Cited

U.S. PATENT DOCUMENTS

| | | | |
|---|---|---|---|
| 2,655,071 | 10/1953 | Levay | 84/411 X |
| 2,837,002 | 6/1958 | Susser | 84/411 X |
| 2,952,189 | 9/1960 | Pajes | 88/73 |
| 3,031,928 | 5/1962 | Kopito | 88/74 |
| 3,052,228 | 9/1962 | Okuda | 126/271 |
| 3,261,016 | 7/1966 | Burr | 343/100 |
| 3,514,776 | 5/1970 | Mulready | 343/6 |
| 3,610,738 | 10/1971 | Bochmann | 350/295 |
| 3,623,796 | 11/1971 | Schweiger | 350/295 |
| 3,647,931 | 3/1972 | Koishikawa | 84/411 |
| 3,972,600 | 8/1976 | Cobarg | 350/295 |
| 4,033,676 | 7/1977 | Brantley, Jr. et al. | 350/295 |
| 4,046,462 | 9/1977 | Fletcher et al. | 350/295 |
| 4,091,274 | 5/1978 | Angelbeck et al. | 250/201 |
| 4,093,351 | 6/1978 | Perkins et al. | 350/310 |
| 4,097,126 | 6/1978 | Mahlein et al. | 350/295 |
| 4,179,193 | 12/1979 | Gillette et al. | 350/295 |
| 4,288,146 | 9/1981 | Johnson, Jr. et al. | 350/295 |

FOREIGN PATENT DOCUMENTS

| | | |
|---|---|---|
| 2301700 | 7/1974 | Fed. Rep. of Germany . |
| 2303781 | 8/1974 | Fed. Rep. of Germany . |
| 2402882 | 4/1979 | France . |

OTHER PUBLICATIONS

"Variable Focal Length Mirrors," J. C. Muirhead, Review of Scientific Instruments, vol. 32, No. 2, Feb. 1961, pp. 210–211.

Primary Examiner—F. L. Evans
Attorney, Agent, or Firm—Roylance, Abrams, Berdo & Goodman

[57] ABSTRACT

A curved reflector of electro-magnetic radiation formed of an elastic, imperforate reflective membrane utilizes a partial vacuum to provide the curvature to the membrane. The device for controlling the evacuation of the housing can be supported within the reflector housing in an adjustable manner to set the control device at a location corresponding to a predetermined deflection of the membrane below a reference plane, and thereby, to permit the focal length of the reflector to be varied. The control device can comprise a membrane contact surface surrounding an orifice which controls, with the interior surface of the membrane, fluid communication between the housing interior and the evacuation mechanism. Other control devices include an electrical limit switch, a light source and sensor, a capacitor or inductor sensing arrangement and a magnetic field sensing arrangement. The membrane can be releasably coupled to the housing via springs to facilitate replacement thereof.

26 Claims, 15 Drawing Figures

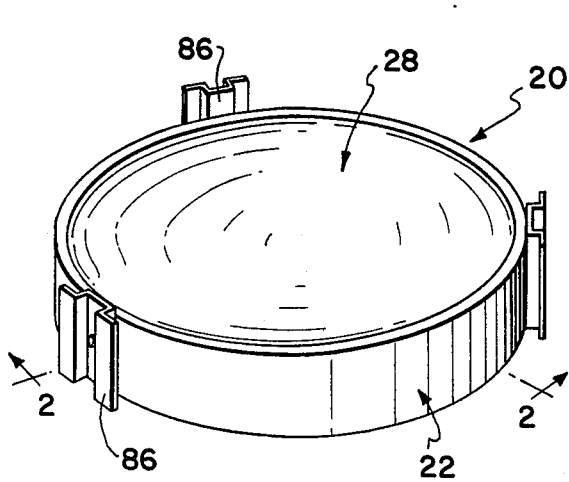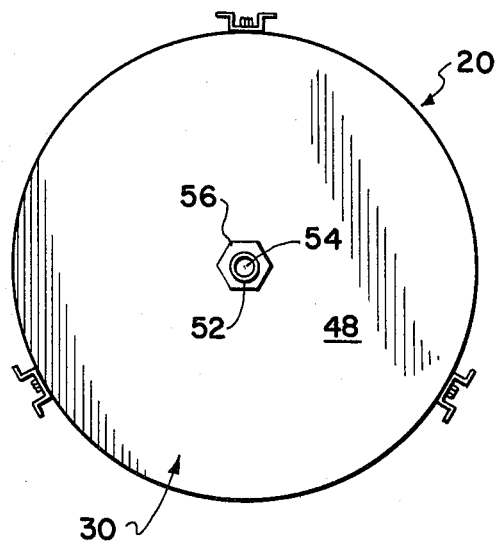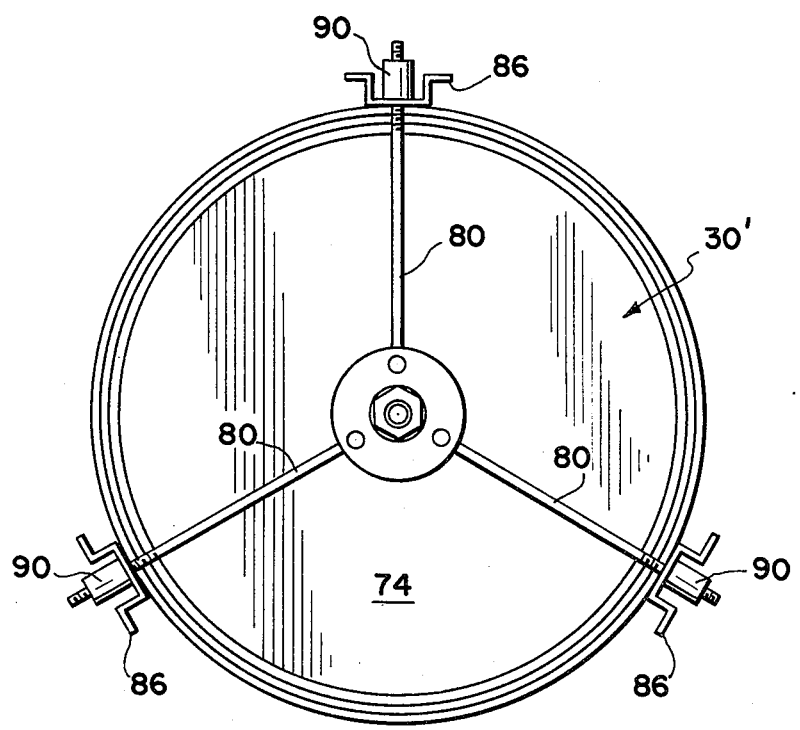

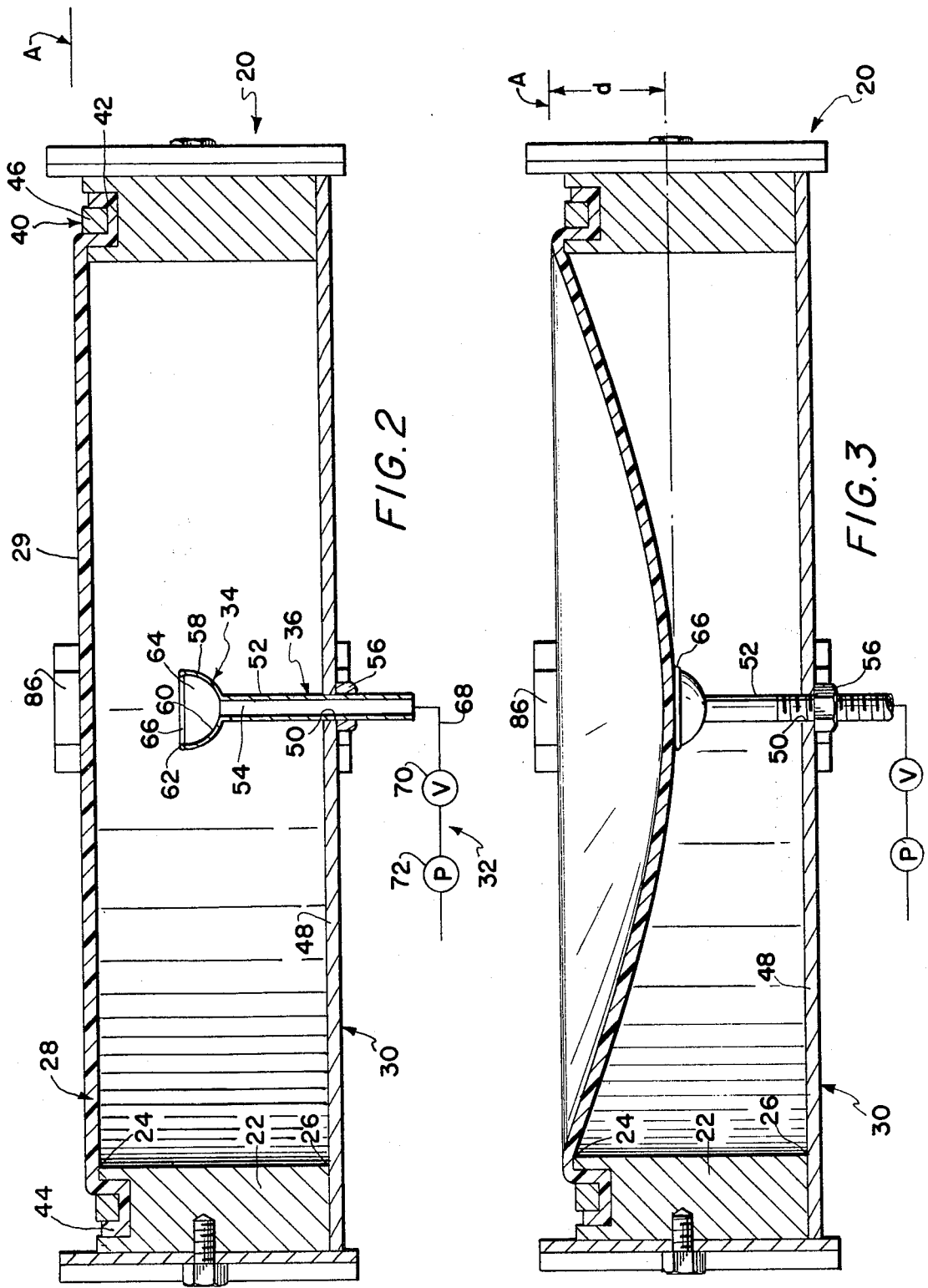

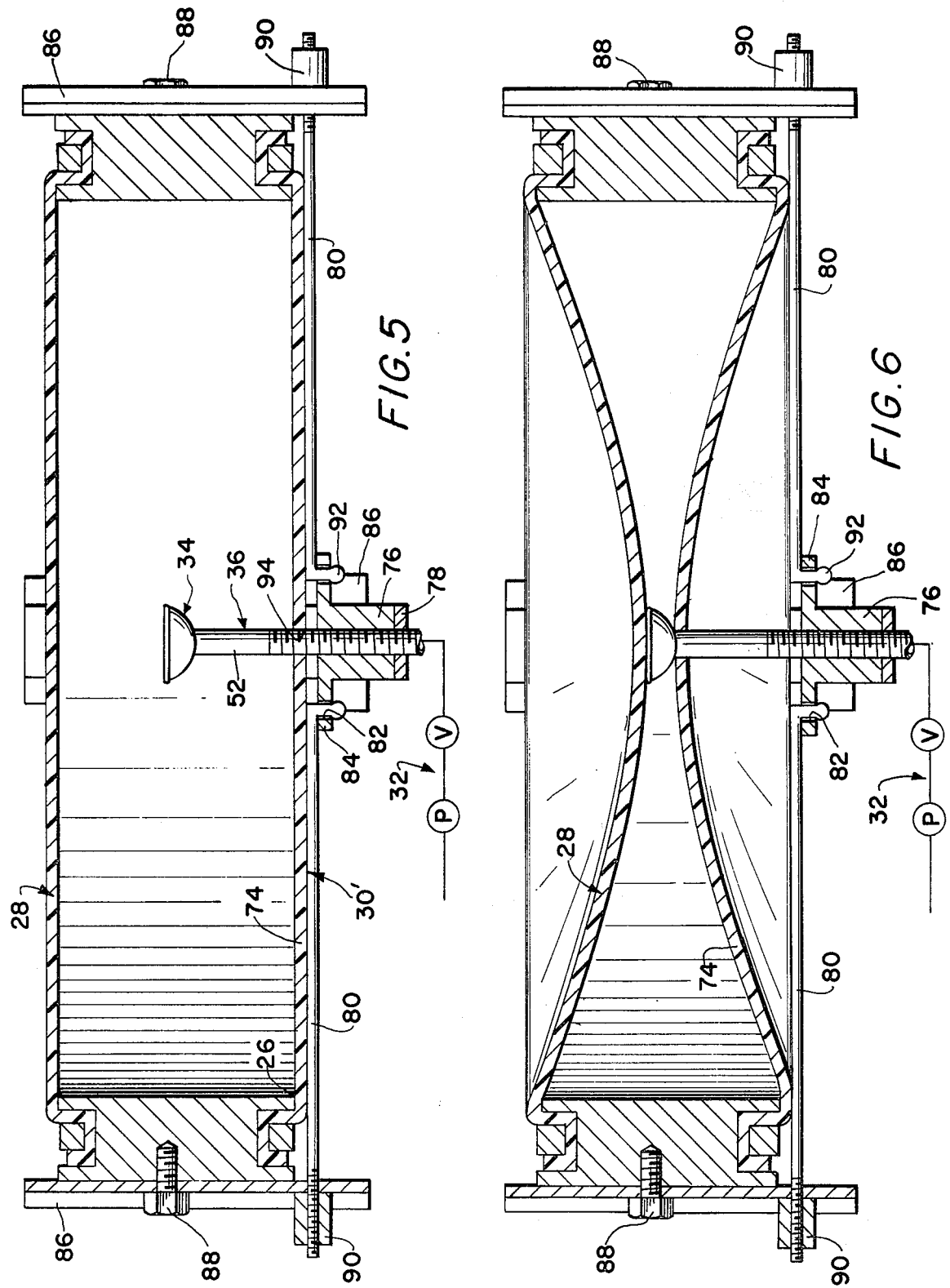

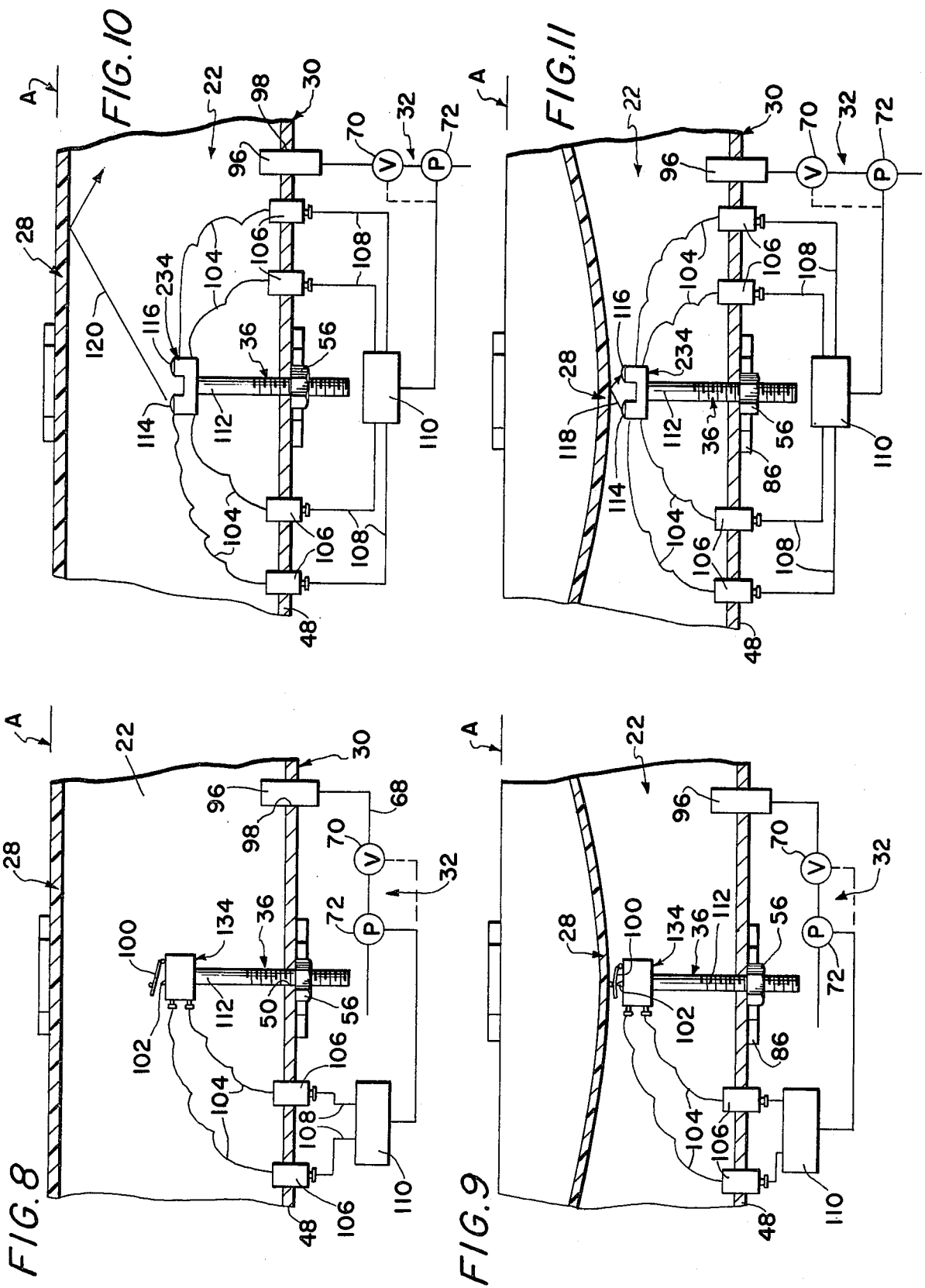

ADJUSTABLE REFLECTOR WITH IMPERFORATE REFLECTIVE MEMBRANE

FIELD OF THE INVENTION

The present invention relates to a curved electromagnetic radiation reflector formed of an elastic, imperforate, reflective membrane which utilizes a partial vacuum to provide the curvature to the membrane and an adjustable control device to vary such curvature, and thus, the focal length. The radiation can be, for example, from the sun.

BACKGROUND OF THE INVENTION

In constructing a system for utilizing solar energy, it is highly advantageous to provide a solar reflector that can concentrate the solar energy and aim that concentrated energy at a specific target. This results in a more efficient system and can reduce the size and cost of the overall system.

While various solar reflectors, and reflectors of other electro-magnetic radiation, have been known in the art, they have tended to be heavy and expensive to make. In addition, many of these devices have complicated or imprecise mechanisms for varying the focal length of the reflector. Typical prior art devices are disclosed in U.S. Pat. Nos. 2,952,189 to Pajes, 3,514,776 to Mulready, 4,033,676 to Brantley, Jr. et al, 4,046,462 to Fletcher et al, and 4,179,193 to Gillette et al. In addition, a variable focal length reflector is disclosed in the article entitled "Variable Focal Length Mirrors", *Review of Scientific Instruments*, Vol. 32, No. 2, February, 1961, pp. 210-211, by J. C. Muirhead.

Another curved reflector with a flexible membrane to adjust its focal length is disclosed in U.S. Pat. application Ser. No. 149,587, entitled "Curved Reflector With Adjustable Focal Length" by Johnson and Peckham, filed May 14, 1980, now U.S. Pat. No. 4,288,146, issued on Sept. 8, 1981. This reflector controls the depth of membrane deflection by a valve. The valve comprises an aperture in the membrane and a flowrestricting surface overlying the aperture and positioned in the housing at a depth equal to that of the desired deflection of the membrane. This arrangement is disadvantageous in that the valve is located on the reflective surface side of the membrane making access thereto difficult and adversely affecting the reflective characteristics of the membrane. Moreover, the use of a perforated membrane permits contaminants, such as water and airborne particulate matter, to enter the reflector and adversely affect its operation.

SUMMARY OF THE INVENTION

Accordingly, a primary object of the present invention is to provide a reflector of electro-magnetic radiation with an easily and accurately adjustable focal length.

Another object of the present invention is to provide a reflector of electro-magnetic radiation which is lightweight and inexpensive to manufacture, install and maintain.

A further object of the present invention is to provide a reflector of electro-magnetic radiation having an imperforate reflective membrane which is unobstructed.

A still further object of the present invention is to provide a reflector of electro-magnetic radiation which can be adjusted by unskilled personnel.

The foregoing objects are basically obtained by a reflector comprising a hollow housing having top and bottom openings with a flexible, elastic, imperforate reflective membrane coupled over the top opening in a gas-tight manner and a base covering the bottom opening in a gas-tight manner. Evacuation means is coupled to the housing for creating a partial vacuum in the housing tending to deflect the membrane below a reference plane and into the housing. Control means regulates evacuation of the housing by the evacuation means. An adjustment means is coupled to the base for supporting and adjustably positioning the control means in the housing at a location corresponding to a predetermined deflection of the membrane below the reference plane.

The foregoing objects are also basically obtained by providing a reflector comprising a hollow housing having top and bottom openings with a flexible, elastic, imperforate reflective membrane coupled over the top opening in a gas-tight manner and a base covering the bottom opening in a gas-tight manner. A tube is mounted in the base with an internal passageway and an upper end in the housing. Evacuation means, in fluid communication with the internal passageway, is provided for creating a partial vacuum in the housing tending to deflect the membrane below a reference plane and into the housing. A membrane contact surface is provided on the upper end of the tube and surrounds an orifice, which orifice is in fluid communication with the internal passageway. The contact surface is positioned at a distance below the reference plane corresponding to a predetermined deflection of the membrane.

The foregoing objects are further basically obtained by providing a reflector comprising a hollow housing having top and bottom openings with a flexible, elastic reflective membrane extending over the top opening and having a peripheral portion located laterally beyond said housing. Coupling means releasably attaches the membrane to said housing in a gas-tight manner and includes spring means, coupled to the peripheral portion and the housing, for tensioning the membrane over the top opening. A base covers the bottom opening in a gas-tight manner. Evacuation means is coupled to the housing for creating a partial vacuum in the housing tending to deflect the membrane below a reference plane and into the housing. Control means regulates evacuation of the housing by the evacuation means.

By forming the reflector in this manner, the focal length may be simply and easily adjusted by unskilled personnel by manipulating the adjustment means. Since the adjustment means is coupled to the base of the reflector, it is readily accessible and does not interfere with the reflective characteristics of the membrane. Since the membrane is imperforate, the focal length will not be adversely affected by environmental conditions such as high winds, rain and dust.

With a control arrangement comprising a membrane contact surface surrounding an orifice at the upper end of the tube, the membrane is simply and accurately deflected to its predetermined configuration. Since the contact surface is positioned a distance below the reference plane corresponding to the predetermined deflection of the membrane, the membrane will, upon reaching the predetermined deflection, engage the contact surface and terminate evacuation of the housing to maintain the membrane in the predetermined configuration.

Replacement of the reflective membrane is greatly facilitated by employing coupling means with spring means for releasably attaching and tensioning the membrane over the housing top opening. The housing need not be replaced with the membrane resulting in substantial cost savings. Additionally, the constant tension in the membrane caused by the spring means compensates for membrane expansion and contraction resulting from temperature changes and aging and facilitates its manufacture since the membrane need not be tensioned before it is coupled to the housing.

The adjustment means can comprise a threaded rod. The base means may comprise a rigid plate or a flexible membrane. The control may be provided by a mechanical arrangement, an electrical limit switch, a light source and sensor, a variable capacitor or inductor arrangement, or a magnetic field sensing arrangement.

Other objects, advantages and salient features of the present invention will become apparent from the following detailed description, which, taken in conjunction with the annexed drawings, discloses preferred embodiments of the present invention.

As used in this application, the terms "top" and "bottom" are intended to facilitate the description of the reflector. Thus, such terms are merely illustrative of the reflector and are not intended to limit the reflector to any specific orientation.

BRIEF DESCRIPTION OF THE DRAWINGS

Referring to the drawings which form a part of this original disclosure:

FIG. 1 is a perspective view of a reflector in accordance with the present invention;

FIG. 2 is a side elevational view in section taken along lines 2—2 in FIG. 1 showing the reflector in accordance with a first embodiment of the present invention in its rest position before a partial vacuum is created inside the housing;

FIG. 3 is a side elevational view in section of the reflector of FIG. 2, after a partial vacuum has been created inside the housing to deflect the reflective membrane therein;

FIG. 4 is a bottom plan view of the reflector of FIG. 2;

FIGS. 5 and 6 are views similar to those shown in FIGS. 2 and 3, respectively, of a second embodiment of the reflector in accordance with the present invention;

FIG. 7 is a bottom plan view of the reflector of FIGS. 5 and 6;

FIGS. 8 and 9 are partial, side elevational views in section of a third embodiment of the reflector in accordance with the present invention;

FIGS. 10 and 11 are partial, side elevational views in section of a fourth embodiment of the reflector in accordance with the present invention;

DETAILED DESCRIPTION OF THE PREFERRED EMBODIMENTS OF THE INVENTION

Figure 12:
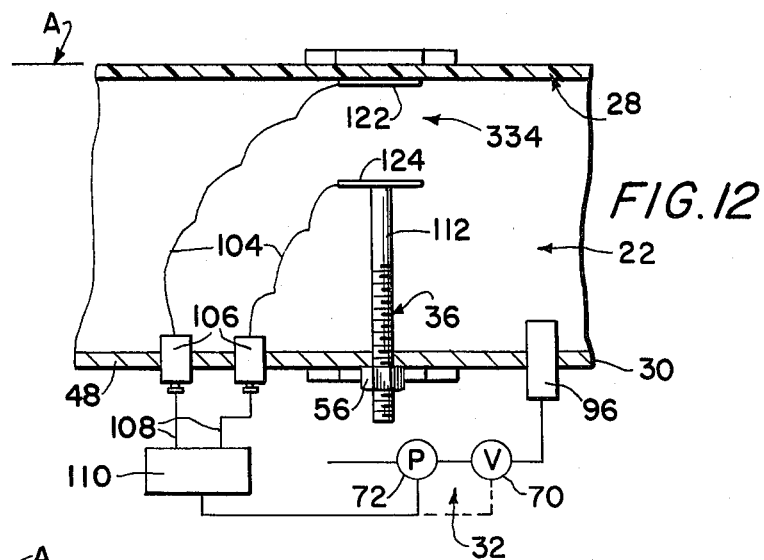
FIGS. 12 and 13 are partial, side elevational views in section of a fifth embodiment of the reflector in accordance with the present invention.

Referring initially to FIGS. 1-4, the reflector 20 in accordance with the present invention, as illustrated, comprises a hollow housing 22 having a top opening 24 and a bottom opening 26. Top opening 24 is covered in a gas-tight manner by a flexible, elastic, imperforate reflective membrane 28. Bottom opening 26 is covered in a gas-tight manner by a rigid base 30. An evacuation assembly 32 is coupled to housing 22 for creating a partial vacuum within the housing. A control device 34 regulates the evacuation of housing 22 by evacuation assembly 32. The control device is supported and adjustably positioned within housing 22 at a location corresponding to a predetermined deflection of the membrane below reference plane A by an adjustment mechanism 36. The focal length of the reflector is varied by varying the amount of deflection of the membrane within the housing. The reflector can be employed for solar radiation, as well as radar, television signals and other electro-magnetic radiation.

Housing 22 is advantageously a right cylindrical tube with openings 24, 26 oriented in planes perpendicular to the axis of the cylindrical housing. Openings 24, 26 as illustrated are annular, although they could be rectangular with the housing having a rectangular cross section.

Membrane 28 has a reflective coating on its exterior surface 29, which coating can be aluminum by, for example, forming the membrane from aluminized Mylar. The membrane is larger in diameter than top opening 24 such that the peripheral portion extends past and completely closes the opening. The thickness of membrane 28 can be between about 0.0005 and about 0.002 inch.

Coupling mechanism 40 attaches membrane 28 to housing 22 in a gas-tight manner. This coupling mechanism comprises an annular groove 42 formed in the top surface of housing 22 concentrically about top opening 24. Peripheral portion 44 of membrane 28 is received in groove 42 and is secured therein by an attaching ring 46. Attaching ring 46 is received over peripheral portion 44 and within annular groove 42. In this manner, peripheral portion 44 is interposed between annular groove 42 and attaching ring 46 to secure membrane 28 to housing 22 in a gas-tight manner. Advantageously, membrane 28 is initially stretched when it is coupled to housing 22 such that in its undisturbed condition, it lies flat in reference plane A as illustrated in FIG. 2. Reference plane A essentially corresponds to the plane containing top opening 24 in housing 22. A plurality of fasteners can be employed to rigidly secure attaching ring 46 to housing 22, if necessary.

Base 30, in the first embodiment, comprises a rigid, solid disc-shaped metal plate 48 having an internally threaded aperture 50 in the center thereof. The peripheral portion of plate 48 is secured in a suitable manner, such as by adhesive, to the lower surface of housing 22 to seal bottom opening 26 in a gas-tight manner. The coupling of plate 48 to housing 22 can also involve the use of conventional seals, fasteners or welding techniques. In the first embodiment of the present invention illustrated in FIGS. 1-4, adjustment mechanism 36 comprises a hollow tube 52 which is threaded externally on the lower portion thereof and which is threadably received within threaded aperture 50 in plate 48. Tube 52 has an internal passageway 54 extending along the length thereof. A lock nut 56 is threaded on the lower portion of tube 52 below plate 48 to secure tube 52 in a desired position relative to base 30 and to reference plane A.

Control device 34 mounted on the top of tube 50 comprises a cup-shaped valve 58 with a generally semispherical interior surface 60 defining a generally semispherical interior volume of the valve. The uppermost portion of valve 58 comprises an annular membrane contact surface 62 which surrounds an orifice 64. Orifice 64 is aligned with and in fluid communication with passageway 54 within tube 52 and with the interior of housing 22 between membrane 28 and base 30. Valve 58 may be formed of metal or plastic. With a valve formed of metal, contact surface 62 can have a resilient, annular gasket 66 of elastomeric material thereon.

Evacuation assembly 32 comprises a fluid line 68 coupled in fluid communication with internal passageway 54 in tube 52, a valve 70 located in line 68 and a pump 72 located in line 68 downstream of valve 70. Valve 70 can be a needle valve or merely a restrictor tube located in fluid line 68 to limit the air flow rate into and out of housing 22.

The operation of reflector 20 will now be described in connection with FIGS. 2 and 3. In the rest condition of the reflector (i.e., prior to the development of a partial vacuum within housing 22), membrane 28 lies in reference plane A as a result of the pretensioning provided by coupling mechanism 40. Tube 52 is threaded within aperture 50 into or out of housing 22 to locate orifice 64 at a distance below reference plane A corresponding to a predetermined maximum deflection d of membrane 28, i.e., at the lowermost point of membrane 28 when deflected to provide the desired focal length. Once tube 52 has properly positioned orifice 64 and contact surface 62 within housing 22, lock nut 56 is rotated to secure tube 52 in position relative to base 30 and reference plane A.

Membrane 28 is deflected inwardly of housing 22 by activating pump 72, thereby creating a partial vacuum in the interior of housing 22. Fluid is withdrawn from the housing interior through orifice 64 and passageway 54 causing membrane 28 to be drawn into the housing and to assume a curved configuration. Membrane 28 will continue to be drawn until it reaches the desired depth d where the lowermost surface of membrane 28 engages contact surface 62 terminating fluid communication between the housing interior and passageway 54 and halting further deflection of membrane 28. The partial vacuum created within the interior of housing 22 and within passageway 54 will maintain membrane 28 in the proper deflected configuration.

In this manner, the deflection of membrane 28 is simply and accurately controlled by its engagement with contact surface 62. The focal length of reflector 20 is easily and accurately modified, especially by unskilled personnel working in the field, by merely adjusting the amount tube 52 is inserted within housing 22. The placement of tube 52 in base 30 facilitates access to perform this adjustment and does not interfere with the reflection characteristics of reflector 20.

FIGS. 5-7 illustrate a second embodiment of the present invention having a modified form of base 30'. In this second embodiment, base 30' comprises a second flexible, elastic membrane 74 which is coupled in a gastight manner over bottom opening 26 in a manner similar to coupling mechanism 40. Membrane 74 need not be reflective.

Tube 52 is supported in an internally threaded sleeve 76. Lock nut 78 is internally threaded and receives the threaded portion of tube 52 to lock tube 52 to sleeve 76 in a desired position. Sleeve 76, as illustrated in FIGS. 5-7, is coupled to housing 22 adjacent the center of base 30' by a plurality of elongated members in the form of spokes 80 having bent ends received in apertures 82 in an annular flange 84 extending from sleeve 76. The ends of spokes 80 remote from flange 84 are rigidly coupled to housing brackets 86. Brackets 86 are rigidly secured to housing 22 by bolts 88. The distal ends of spokes 80 are threaded, received in bores in brackets 86 and secured therein by nuts 90. The bent ends of spokes 80 have enlarged beads 92 to secure them in apertures 82.

Tube 52 extends through an aperture 94 in membrane 74. The surface of aperture 94 forms a seal with the periphery of tube 52 in both the rest and deflected configurations of the membrane.

The operation of the second embodiment is similar to that of the first embodiment. Thus, the operation of the second embodiment is not discussed in detail. However, it should be noted that in the second embodiment the second membrane 74 is deflected into housing 22 along with the reflective membrane 28, as illustrated in FIG. 6.

Referring now to FIGS. 8 and 9, a third embodiment of the present invention is illustrated in which a limit switch arrangement is used to control the deflection of reflective membrane 28. In this embodiment, evacuation assembly 32 comprises a tube 96 fixedly mounted in an aperture 98 in base 30. Fluid line 68 with valve 70 and pump 72 are coupled in fluid communication with tube 96 and therethrough with the interior of housing 22.

The control device 134 in this embodiment comprises an electrical limit switch. The limit switch has contacts 100, 102 which are normally biased to an open electrical condition, as illustrated in FIG. 8. Contacts 100, 102 are electrically coupled through wires 104, terminals 106 and leads 108 to a conventional electrical control circuit 110. Electrical control circuit 110 is suitably coupled to vacuum pump 72 to regulate activation and deactivation of pump 72 in response to the opening and closing of contacts 100, 102. When contacts 100, 102 are opened, pump 72 is activated to create a partial vacuum within housing 22. When contacts 100, 102 are closed, pump 72 is deactivated to stop evacuation of housing 22 and to halt deflection of membrane 28, as illustrated in FIG. 9.

The limit switch 134 may also be one having internal contacts, allowing an operational logic reversed to the one described above.

Alternatively, control circuit 110 may regulate opening and closing of valve 70 instead of activation and deactivation of pump 72 to control the partial vacuum created within the housing 22, as indicated by the dashed lines.

Adjustment mechanism 36 comprises an externally threaded rod or bolt 112 received in internally threaded aperture 50 in base 30. The electrical limit switch control device 134 is mounted on the top end of bolt 112 such that the distance at which device 134 is located below reference plane A may be easily adjusted by threading bolt 112 into or out of aperture 50. In this manner, device 134 may be positioned below reference plane A a distance corresponding to the predetermined or desired deflection of the membrane within housing 22 below reference plane A. A lock nut 56 is threaded on the lower end of bolt 112 to secure bolt 112, and thereby electrical limit switch device 134, in a desired position relative to reference plane A and base 30. The wires 104 are provided with sufficient slack to permit adjustment of bolt 112 within aperture 50.

In operation, bolt 112 is adjusted to locate electrical limit switch control device 134 at a distance below reference plane A corresponding to a predetermined deflection of the membrane within housing 22. The evacuation pump is activated to develop a partial vacuum within housing 22 to commence deflection of the membrane below reference plane A. When reflective membrane 28 has deflected to the position illustrated in FIG. 9 in which the lowermost portion of the membrane engages contact 100 and forces it against contact 102 to close the contacts, such condition of the contacts is sensed by control circuit 110. Upon sensing closing of contacts 100, 102, control circuit 110 deactivates evacuation pump 72 or closes valve 70 to stop evacuation of the housing interior. The partial vacuum within housing 22 is maintained to retain reflective membrane 28 in the desired deflected configuration.

A fourth embodiment of the present invention is illustrated in FIGS. 10 and 11. In this fourth embodiment, the control device 234 for regulating deflection of reflective membrane 28 below reference plane A comprises a light source 114 and a light sensor 116. Both the light source and the light sensor are mounted on the top of control device 234. A reflective surface can be provided on all or on only a portion of the bottom surface of membrane 28. Light source 114 is focused on the center of membrane 28 such that when membrane 28 is deflected to its predetermined deflection, the light (indicated by arrow 118) from light source 114 is reflected off the bottom of the membrane and onto light sensor 116, as illustrated in FIG. 11. When the membrane is not in its predetermined deflected configuration, the light (indicated by arrow 120) reflects on an off-center position on membrane 28 so that the light is not directed onto the light sensor 116. Light source 114 and light sensor 116 are electrically coupled through wires 104, terminals 106 and leads 108 to a suitable control circuit 110. When light is not sensed by sensor 116, no electrical signal is produced thereby. However, when light is sensed in sensor 116, an electrical signal is transmitted to control circuit 110. The presence or absence of an electrical signal from sensor 116 regulates deactivation and activation of pump 72 or regulates closing and opening of valve 70 through control circuit 110.

In operation, light control device 234 is adjustably mounted within housing 22 to a position corresponding to a predetermined deflection of membrane 28 below reference plane A. This position will be somewhat below the lowermost portion of membrane 28 in its deflected configuration due to the nature of the operation of the light control device 234. Pump 72 is initially activated to create a partial vacuum in housing 22 to deflect membrane 28 below reference plane A and into housing 22. Light is emitted from light source 114 against the inner surface of membrane 28 to continually test the position of membrane 28. When the membrane is still above its predetermined position, the light, as indicated by arrow 120, is deflected off membrane 28 to a position remote from light sensor 116 such that no light is sensed thereby and no electrical signal is sent to control circuit 110. During this period, pump 72 continues to create a partial vacuum through tube 96. When membrane 28 has been deflected to its predetermined position, light from source 114 is deflected, as indicated by arrow 118, to light sensor 116. Light sensor 116 then produces an electrical signal upon sensing the light reflected off the membrane from light source 114, which electrical signal is sent to control circuit 110. This electrical signal causes circuit 110 to deactivate pump 72 or close valve 70 to halt evacuation of housing 22 and halt deflection of reflective membrane 28. Since the partial vacuum is maintained within housing 22, the reflective membrane 28 will be retained in its predetermined deflected position, as illustrated in FIG. 11.

Figure 13:
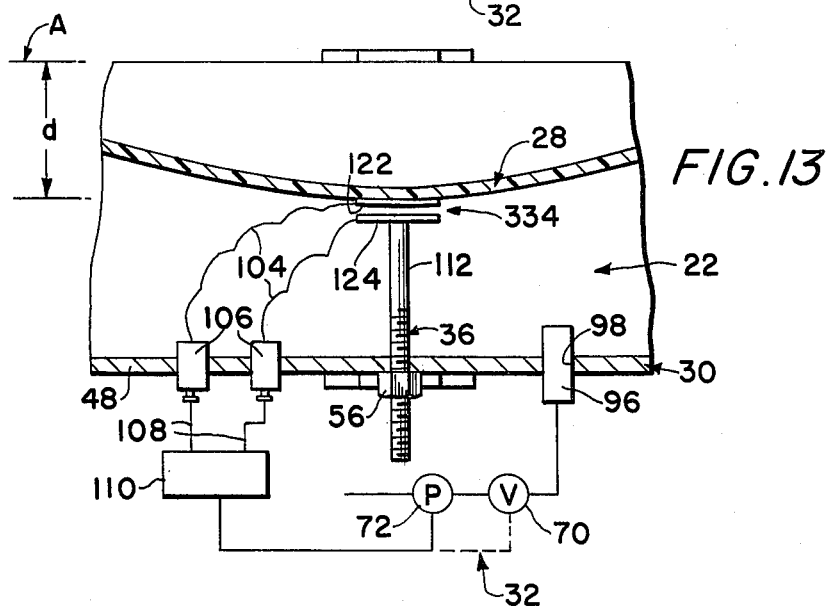

A fifth embodiment of the present invention is illustrated in FIGS. 12 and 13. This fifth embodiment employs a capacitive sensor control device 334 to regulate deflection of reflective membrane 28. The capacitive device comprises two electrically conductive capacitor plates 122, 124. The upper capacitor plate 122 is bonded or otherwise attached at a single central location thereof to the center of the internal surface of reflective membrane 28. Attachment of plate 122 in only a single location permits plate 122 to remain substantially planar during deflection of membrane 28. The metallized film on reflective membrane 28 cannot reliably be employed as a sensor plate since the metallization weathers and deteriorates rapidly. The weathering and deterioration of the metallization would vary the capacitance value obtained at a given deflection of the membrane, thereby creating control and accuracy problems.

The lower aluminum plate 124 is fixed to bolt 112 of adjustment mechanism 36 by a suitable device, such as a screw fastener. In this embodiment, bolt 112 is made of electrically non-conductive material, or the plate must be electrically insulated from bolt 112, if bolt 112 is formed of metal.

Plates 122, 124 are electrically coupled to electrical control circuit 110 through wires 104, terminals 106 and leads 108. When the plates are subjected to an electrical potential, the electrical capacitance between the two plates varies depending upon the spacing between the plates. The closer the plates are together, the greater the electrical capacitance, while the further away the plates are, the lesser the electrical capacitance. The capacitor can, for example, be part of a resonant circuit in control circuit 110, the frequency of which varies with capacitance. This variation in frequency can then be used by control circuit 110 to activate and deactivate pump 72 or to open and close valve 70 in response to the variance in capacitance.

Initially, the reflector is in the rest position, as illustrated in FIG. 12. Prior to activation of pump 72, bolt 112 is adjusted to locate plate 124 at a distance below reference plane A corresponding to the predetermined deflection d of membrane 28 below reference plane A. An electrical potential is developed across plates 122, 124 and pump 72 is activated to create a partial vacuum in the interior of housing 22 through tube 96. As the partial vacuum within housing 22 increases and reflective membrane 28 deflects into housing 22, the electrical capacitance between plates 122, 124 increases markedly. When the capacitance reaches a value corresponding to the predetermined deflection d of reflective membrane 28, control circuit 110 deactivates pump 72 or closes valve 70 halting evacuation of housing 22 and deflection of membrane 28. The partial vacuum is maintained in housing 22 to retain the membrane in its desired position.

Figure 14:
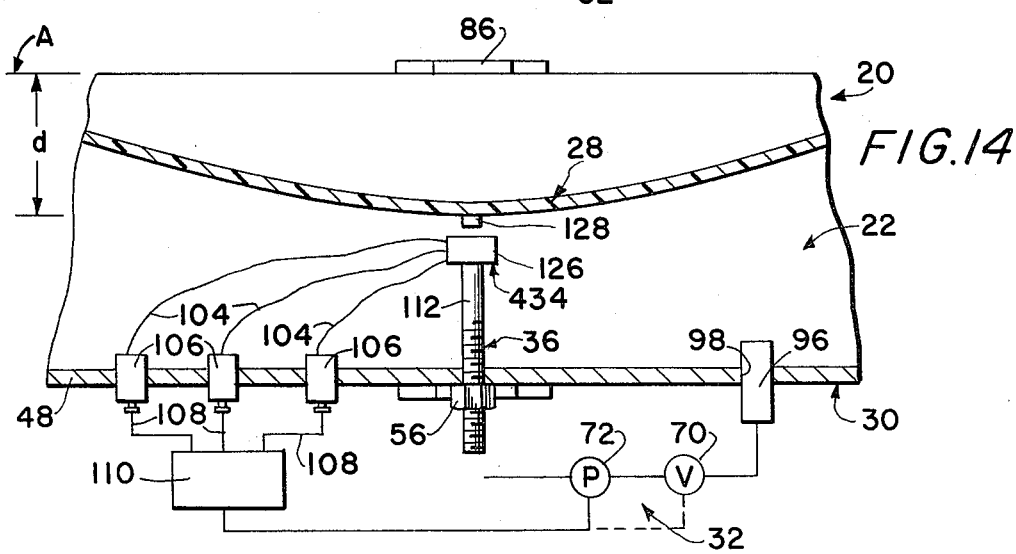
FIG. 14 is a partial, side elevational view in section of a sixth embodiment of the reflector in accordance with the present invention.

A sixth embodiment of the reflector in accordance with the present invention is illustrated in FIG. 14. In this embodiment, control device 434 can take the form of a proximity sensor 126 such as a device that detects the proximity of a magnetic field, such as a magnetic reed switch or a solid state Hall effect sensor. Alternatively, sensor 126 can be a coil having known inductive characteristics. When device 434 is a reed switch or Hall effect device, a small permanent magnet 128 is bonded or otherwise fixedly attached to the center of the interior surface of reflective membrane 28. The magnetic proximity sensor produces an electrical signal which varies either continuously, in the case of a Hall effect device, or stepwise in the case of a reed switch, depending upon the proximity of a magnetic field thereto. Thus, the electrical signal produced by sensor 126 varies depending upon the distance of magnet 128 therefrom. When sensor 126 is a coil, it cooperates with a core 128 of conventional ferromagnetic material the proximity of which to the coil varies its inductance. The coil, as with the capacitor, can form part of a resonant circuit in control circuit 110. Wires 104, terminals 106 and leads 108 electrically couple sensor 126 to electrical control circuit 110 which is coupled to pump 72 to activate and deactivate the pump or which is coupled to valve 70 to open and close the valve.

Proximity sensor 126 is mounted on the top end of bolt 112 of adjustment mechanism 36 to permit adjustment of sensor 126 to a location below reference plane A corresponding to a predetermined deflection of the membrane. In this manner, the focal length for reflector 20 may be varied.

In operation, sensor 126 is located in a position within housing 22 corresponding to the desired deflection d of membrane 28. Pump 72 is then activated to create a partial vacuum causing deflection of reflective membrane 28 within housing 22. When membrane 28 reaches the desired deflected configuration, such configuration is sensed by sensor 126, by sensing the position of magnet or core 128, and sensor 126 sends a particular electrical signal to control circuit 110. This signal causes control circuit to deactivate pump 72 or close valve 70. As in the previous embodiments, the partial vacuum is maintained within housing 22 to retain membrane 28 in the reflective configuration.

Figure 15:
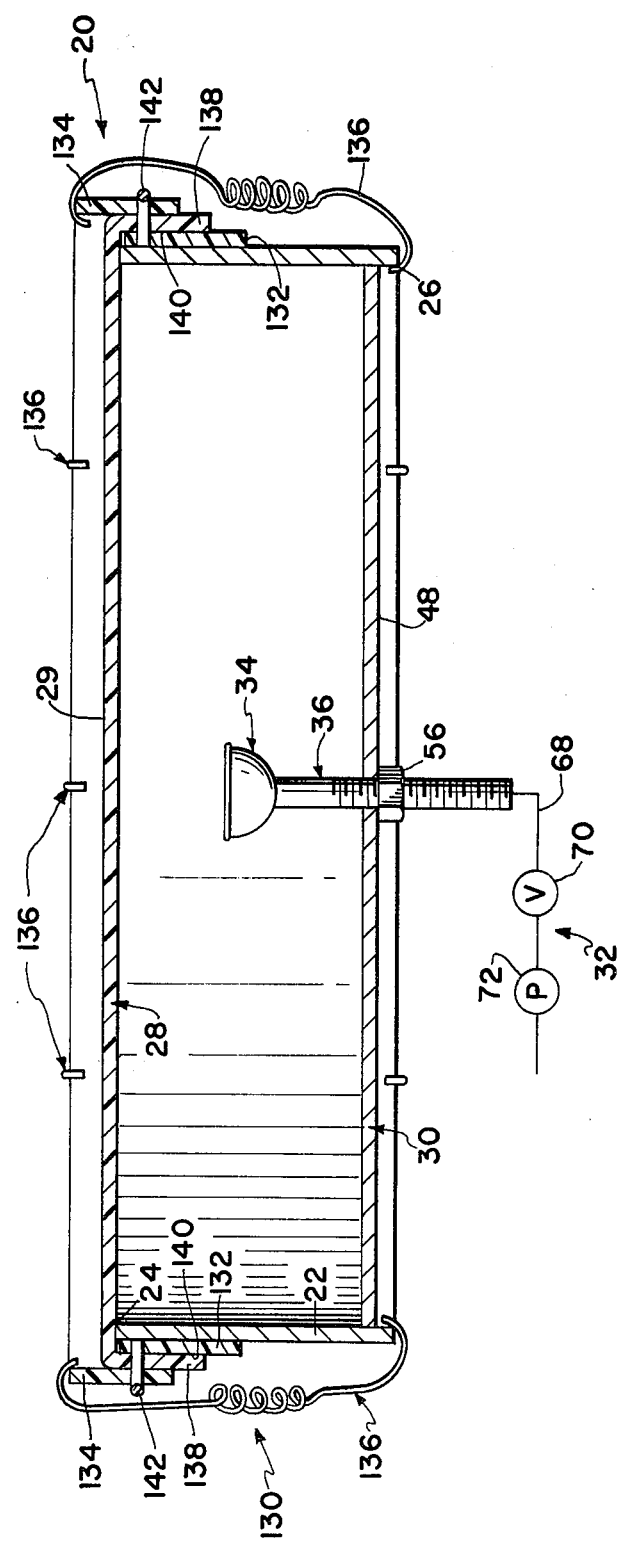
FIG. 15 is a side elevational view in section of a seventh embodiment of the reflector in accordance with the present invention.

A seventh embodiment in accordance with the present invention is illustrated in FIG. 15 in which the reflective membrane 28 is releasably coupled to housing 22. In the seventh embodiment, the coupling mechanism 40 of the previous embodiments is replaced by detachable coupling mechanism 130 which comprises rigid inner and outer annular rim members 132, 134, formed of relatively inexpensive materials such as plastic or masonite, and springs 136.

Inner and outer rim members 132, 134 are fixed to the inner and outer surfaces, respectively, of the peripheral portion 138 of membrane 28 and are axially offset such that the outer rim member extends above the inner rim member and the membrane. Inner rim member 132 is fixed to the membrane inner surface by double sided tape or adhesive 140. Outer rim member 139 is fixed to peripheral portion 138 and to inner rim member 132 by a plurality of suitable fasteners, such as staples 142.

Springs 136 are formed with hooked ends and are attached at their upper ends over the upper edge of outer rim member 134 and at their lower ends over the lower edge of housing 22. Plate 48 forming the base 30 for the reflector is spaced upwardly from bottom opening 26 to provide a lip at opening 26 to facilitate the engagement of the lower hooked ends of springs 136. Typically, eight springs are equally spaced about housing 22.

Membrane 28 is manufactured with rim members 134, 136 prior to mounting on housing 22. Since the membrane is tensioned by springs 136, the membrane need not be tensioned during the attachment of the rim members, thereby simplifying its manufacture.

The membrane, with the rim members secured thereto, is fitted over top opening 24 such that peripheral portion 138 and rim members 132, 134 are located laterally beyond and coaxially with housing 22. Springs 136 are then coupled to outer rim member 134 and to the bottom edge of housing 22 to tension membrane 28 over the top edge of the housing and to form a gas-tight seal therebetween. The membrane is removed by detaching the springs and then lifting the membrane and rim member assembly from the housing. In this manner, the membrane may be simply and quickly installed and removed from housing 22 to facilitate its replacement without replacing housing 22, and is constantly tensioned to compensate for temperature changes and aging stretch.

The operation of the seventh embodiment is substantially identical to that of the first embodiment. Thus, the operation of the seventh embodiment is not discussed in detail.

Although each of the embodiments of FIGS. 8–15 have been illustrated and discussed as having a base 30 comprising a rigid plate 48, such rigid plate may be replaced by the flexible membrane base arrangement illustrated in FIGS. 5–7.

In each of the above embodiments, a suitable venting mechanism can be provided to permit the partial vacuum to be relieved within housing 22.

While various embodiments have been chosen to illustrate the invention, it will be understood by those skilled in the art that various changes and modifications can be made therein without departing from the scope of the invention as defined in the appended claims.

What is claimed is:

1. A reflector comprising:
    a hollow housing having top and bottom openings;
    a flexible, elastic imperforate reflective membrane, coupled over said top opening in a gas-tight manner;
    base means for covering said bottom opening in a gas-tight manner;
    evacuation means, coupled to said housing, for creating a partial vacuum in said housing tending to deflect said membrane below a reference plane and into said housing;
    control means for regulating evacuation of said housing by said evacuation means; and
    adjustment means, coupled to said base means, for supporting and adjustably positioning said control means in said housing at a location corresponding to a predetermined deflection of said membrane below said reference plane.

2. A reflector according to claim 1, wherein said adjustment means comprises a rod movably mounted in an aperture in said base means and lock means for releasably securing said rod in a predetermined position.

3. A reflector according to claim 2, wherein said rod is externally threaded.

4. A reflector according to claim 3, wherein said base means comprises a substantially rigid plate, and said aperture is formed therein and is internally threaded.

5. A reflector according to claim 1, wherein said base means comprises a substantially rigid plate secured in a gas-tight manner to said housing.

6. A reflector according to claim 1, wherein said base means comprises a flexible, elastic membrane; and said adjustment means comprises a rod and a sleeve, said sleeve movably receiving said rod and being rigidly coupled to said housing.

7. A reflector according to claim 1, wherein said control means comprises a membrane contact surface surrounding an orifice; said adjustment means comprises a tube having an internal passageway in fluid communication with said orifice; and said evacuation means is in fluid communication with said passageway.

8. A reflector according to claim 7, wherein a resilient, annular gasket is mounted on said contact surface.

9. A reflector according to claim 7, wherein said tube is externally threaded.

10. A reflector according to claim 1, wherein said control means comprises a cup-shaped valve with a generally semi-spherical interior volume facing said membrane; said adjustment means comprises a tube having an internal passageway in fluid communication with said interior volume; and said evacuation means is coupled to said housing through said tube and said valve.

11. A reflector according to claim 1, wherein said control means comprises an electrical limit switch operated by contact with said membrane when deflected to said predetermined deflection.

12. A reflector according to claim 1, wherein said control means comprises a light source focused on the center of said membrane when deflected to said predetermined deflection, and a light sensor means for producing an electrical signal upon receiving light reflected off said membrane from said light source.

13. A reflector according to claim 1, wherein said control means comprises a first capacitor plate attached to said membrane and a second capacitor plate mounted on said adjustment means, said plates formed of electrically conductive material; and said control means regulates said evacuation means by the change in electrical capacitance between said plates.

14. A reflector according to claim 1, wherein said control means comprises a magnet attached to said membrane and a magnetic proximity sensor mounted on said adjustment means.

15. A reflector according to claim 1, wherein said control means comprises a core attached to said membrane and a coil mounted on said adjustment means; and said control means regulates said evacuation means by the change in inductance of said coil.

16. A reflector according to claim 1, wherein
said reflective membrane is coupled to a tubular member and
said tubular member is received on the outside of said hollow housing adjacent said top opening.

17. A reflector according to claim 16, wherein said tubular member is a ring.

18. A reflector according to claim 1, and further comprising
a plurality of elongated members, coupled to said housing and to said adjustment means, for supporting said adjustment means below said reference plane.

19. A reflector according to claim 18, wherein said elongated members are spokes.

20. A reflector comprising:
a hollow housing having top and bottom openings;
a flexible, elastic, imperforate reflective membrane coupled over said top opening in a gas-tight manner;
base means for covering said bottom opening in a gas-tight manner;
a tube mounted in said base means with an internal passageway and an upper end in said housing;
evacuation means, in fluid communication with said internal passageway, for creating a partial vacuum in said housing tending to deflect said membrane below a reference plane and into said housing; and
a membrane contact surface on said upper end of said tube and surrounding an orifice, said orifice being in fluid communication with said internal passageway, said contact surface positioned at a distance below said reference plane corresponding to a predetermined deflection of said membrane.

21. A reflector according to claim 20, wherein said tube is movably mounted in an aperture in said base means and is coupled to lock means for releasably securing said tube, and thereby said membrane contact surface, in a predetermined position relative to said reference plane.

22. A reflector comprising:
a hollow housing having top and bottom openings;
a flexible, elastic reflective membrane extending over said top opening and having a peripheral portion located laterally beyond said housing;
coupling means for releasably attaching said membrane to said housing in a gas-tight manner, said coupling means including spring means, coupled to said peripheral portion and said housing, for tensioning said membrane over said top opening;
base means for covering said bottom opening in a gas-tight manner;
evacuation means, coupled to said housing, for creating a partial vacuum in said housing tending to deflect said membrane below a reference plane and into said housing;
control means for regulating evacuation of said housing by said evacuation means; and
adjustment means, coupled to said base means, for supporting and adjustably positioning said control means in said housing at a location corresponding to a predetermined deflection of said membrane below said reference plane.

23. A reflector according to claim 22, wherein said coupling means further includes a rim member fixed about said membrane peripheral portion and coupling said spring means to said membrane.

24. A reflector according to claim 22, wherein said coupling means further includes inner and outer rim members fixed to inner and outer surfaces, respectively, of said membrane peripheral portion.

25. An adjustable reflector comprising:
a cylindrical housing having an open end;
an elastic, reflective membrane;
a ring;
means for fastening said membrane to said ring so said membrane spans the interior of said ring;
means for releasably coupling said ring to said housing so said membrane forms a gas-tight closure over said housing open end; and
means, coupled to said housing, for drawing said membrane into said housing by an adjustable amount to provide an adjustable curvature thereto, said means for drawing comprising:

evacuation means, coupled to said housing, for creating a partial vacuum in said housing tending to deflect said membrane below a reference plane and into said housing, control means for regulating evacuation of said housing by said evacuation means, and adjustment means, coupled to said housing, for supporting and adjustably positioning said control means in said housing at a location corresponding to a predetermined deflection of said membrane below said reference plane.

26. A reflector comprising:

a hollow housing having top and bottom openings;

a flexible, elastic imperforate reflective membrane, coupled over said top opening in a gas-tight manner;

base means for covering said bottom opening in a gas-tight manner;

evacuation means, coupled to said housing, for creating a partial vacuum in said housing tending to deflect said membrane below a reference plane and into said housing;

control means for regulating evacuation of said housing by said evacuation means; and adjustment means, coupled to said housing, for supporting and adjustably positioning said control means in said housing at a location corresponding to a predetermined deflection of said membrane below said reference plane.

* * * * *